US008689726B2

(12) United States Patent
Krogman et al.

(10) Patent No.: US 8,689,726 B2
(45) Date of Patent: *Apr. 8, 2014

(54) AUTOMATED LAYER BY LAYER SPRAY TECHNOLOGY

(75) Inventors: Kevin C. Krogman, Cambridge, MA (US); Paula T. Hammond, Newton, MA (US); Nicole S. Zacharia, Cambridge, MA (US)

(73) Assignee: Massachusetts Institute Of Technology, Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/543,105

(22) Filed: Jul. 6, 2012

(65) Prior Publication Data

US 2012/0269973 A1    Oct. 25, 2012

Related U.S. Application Data

(63) Continuation of application No. 12/310,805, filed as application No. PCT/US2007/019371 on Sep. 5, 2007, now Pat. No. 8,234,998.

(60) Provisional application No. 60/843,360, filed on Sep. 8, 2006.

(51) Int. Cl.
*B05B 7/06* (2006.01)
*B05C 13/02* (2006.01)
*B05C 11/00* (2006.01)

(52) U.S. Cl.
USPC ........... 118/313; 118/315; 118/325; 118/500; 427/294; 427/402; 427/470; 977/773

(58) Field of Classification Search
USPC ......... 118/326, 323, 321, 313–315, 679, 684, 118/500, 325; 427/427.1, 421.1, 427.3, 427/427.4, 402, 214, 426, 470, 294, 352; 239/102.2; 435/18; 204/450; 977/773; 68/205 R
See application file for complete search history.

(56) References Cited

U.S. PATENT DOCUMENTS 2,996,406 A     8/1961    Weinrich
3,135,023 A *   6/1964    Kalwaites ................ 19/150
(Continued)

FOREIGN PATENT DOCUMENTS

EP    1508446 A1    2/2005
FR    2029384 A1    10/1970
(Continued)

OTHER PUBLICATIONS

Extended European Search Report dated Oct. 4, 2012 in corresponding European Patent Application No. EP 07837746 (MIT-12307PCT-Europe).
(Continued)

*Primary Examiner* — Yewebdar Tadesse
(74) *Attorney, Agent, or Firm* — Nields, Lemack & Frame, LLC

(57) ABSTRACT

The present invention comprises an automated apparatus capable of spray depositing polyelectrolytes via the LbL mechanism with minimal or no human interaction. In certain embodiments, the apparatus sprays atomized polyelectrolytes onto a vertically oriented substrate. To counteract the effects of irregular spray patterns, the substrate is preferably slowly rotated about a central axis. In certain embodiments, the apparatus also includes a forced pathway for the droplets, such as a pathway created by using a vacuum. In this way, a thicker or three-dimensional substrate can be coated. In certain embodiments, the apparatus is designed so as to be scalable. Thus, through the use of multiple instantiations of the apparatus, a large or irregularly shaped substrate can be coated. Rolls of textile can therefore be coated using the apparatus. Additionally, the present invention includes a method to uniformly coat a substrate, such as a hydrophobic textile material, using aqueous solutions of polyelectrolytes.

14 Claims, 9 Drawing Sheets

(56) References Cited

U.S. PATENT DOCUMENTS

| | | | |
|---|---|---|---|
| 3,630,883 | A | 12/1971 | Turner |
| 4,174,261 | A | 11/1979 | Pellegrino |
| 5,074,132 | A * | 12/1991 | Koller .................. 68/205 R |
| 5,172,443 | A | 12/1992 | Christ |
| 5,704,230 | A | 1/1998 | McClain et al. |
| 5,942,035 | A * | 8/1999 | Hasebe et al. .................. 118/52 |
| 5,945,161 | A * | 8/1999 | Hashimoto et al. ........... 427/240 |
| 6,176,982 | B1 | 1/2001 | Rickerby |
| 6,250,511 | B1 | 6/2001 | Kelly |
| 6,485,981 | B1 | 11/2002 | Fernandez |
| 6,547,883 | B2 * | 4/2003 | Molnar et al. ................. 118/325 |
| 6,702,894 | B2 | 3/2004 | Lee et al. |
| 7,112,361 | B2 | 9/2006 | Lynn et al. |
| 7,270,973 | B2 | 9/2007 | Singh et al. |
| 8,234,998 | B2 | 8/2012 | Krogman et al. |
| 2004/0241599 | A1 | 12/2004 | Fromson et al. |
| 2004/0257422 | A1 | 12/2004 | Herman et al. |
| 2005/0048570 | A1 | 3/2005 | Weber et al. |
| 2005/0136522 | A1 | 6/2005 | Singh et al. |
| 2005/0163714 | A1 | 7/2005 | Sukhishvili et al. |
| 2006/0280865 | A1 * | 12/2006 | Tateishi ................ 427/240 |
| 2007/0061980 | A1 | 3/2007 | Craamer |
| 2007/0184178 | A1 * | 8/2007 | Yamamoto et al. ................ 427/8 |

FOREIGN PATENT DOCUMENTS

| | | |
|---|---|---|
| FR | 2699213 A1 | 6/1994 |
| JP | 48-9662 U | 3/1973 |
| JP | 50-70511 U | 6/1975 |
| JP | 55-61474 U | 4/1980 |
| JP | 64-34460 A | 2/1989 |
| JP | 2003-300274 A | 10/2003 |
| JP | 2005-254152 A | 9/2005 |
| WO | 93/08929 A1 | 5/1993 |
| WO | 95/02251 A2 | 1/1995 |
| WO | 2005/087979 A2 | 9/2005 |
| WO | 2006/086391 A2 | 8/2006 |

OTHER PUBLICATIONS

Journal of the American Chemical Society, ACS Publications, vol. 123, No. 22, Jan. 2001, pp. 5368-5369, XP003003951, "Multiple Membranes from True Polyelectrolyte Multilayers", Dubas, et al.
International Search Report and Written Opinion mailed Apr. 18, 2008 in corresponding PCT application No. PCT/US07/19371 (MIT-12307).
Japanese Communication dispatched Aug. 28, 2012 in corresponding Japanese Patent Application No. 2009-527395 (MIT-12307-Japan).
Japanese Communication dispatched Apr. 23, 2013 in corresponding Japanese Patent Application No. 2009-527395 (MIT-12307-Japan).

* cited by examiner (PAMAM/PAA)$_n$ Growth Trend (PEO/PAA)$_n$ Growth Trend

AUTOMATED LAYER BY LAYER SPRAY TECHNOLOGY

This application is a continuation of U.S. patent application Ser. No. 12/310,805 filed Jul. 6, 2009, now U.S. Pat. No. 8,234,998 which is a 371 of PCT/US2007/019371 filed Sep. 5, 2007, which claims priority of U.S. Provisional Application 60/843,360 filed Sep. 8, 2006, the disclosures of which are incorporated herein by reference.

This invention was made with government support under Grant No. DAAD19-02-D-0002, awarded by the Army Research Office. The government has certain rights in this invention.

BACKGROUND OF THE INVENTION

Over the past decade, the technique of polymer thin film deposition known as "Layer-by-Layer" has proven its versatility in creating very uniform films of precisely controllable thickness, even on the nanometer length scale. This process is commonly used to assemble films of oppositely charged polyelectrolytes electrostatically, but other functionalities such as hydrogen bonding can be the driving force for film assembly. Typically, this deposition process involves the submersion of a substrate having an inherent surface charge into a series of liquid solutions, or baths. Exposure to the first polyion bath, which has charge opposite that of the substrate, results in charged species near the substrate surface adsorbing quickly, establishing a concentration gradient, and drawing more polyelectrolyte from the bulk solution to the surface. Further adsorption occurs until a sufficient layer has developed to mask the underlying charge and reverse the net charge of the substrate surface. In order for mass transfer and adsorption to occur, this exposure time is typically on the order of minutes. The substrate is then removed from the first polyion bath, and is then exposed to a series of water rinse baths to remove any physically entangled or loosely bound polyelectrolyte. Following these rinse baths, the substrate is then exposed to a second polyion bath, which has charge opposite that of the first polyion bath. Once again adsorption occurs, since the surface charge of the substrate is opposite that of the second bath. Continued exposure to the second polyion bath then results in a reversal of the surface charge of the substrate. A subsequent rinsing is then performed to complete the cycle. This sequence of steps is said to build up one 'layer pair' of deposition and can be repeated as desired to add further layer pairs to the substrate.

While this procedure as described is able to produce extremely uniform films as thin as one nanometer per layer pair, it is not uncommon that an individual layer pair may require upwards of thirty minutes to deposit. For a twenty-five layer pair film, the deposition process may then require more than twelve hours to complete. As a result, the Layer-by-Layer (LbL) dipping technique is typically carried out by a computer controlled slide-stainer to eliminate the need for human interaction. The choice of polyelectrolyte solvent is thereby typically limited to those solvents with relatively low vapor pressure, such as water, to avoid evaporation and species concentration during extended dipping periods.

Furthermore, since LbL is typically based on an electrostatic phenomenon, the degree of ionization of each polyelectrolyte in solution has a profound effect on the strength of interaction felt with the surface, and thus, the thickness of the adsorbed layer. For weak polyelectrolytes, pH has been most commonly used to vary charge density along the polymer chain and thus control layer thickness. For strong polyelectrolytes, charge shielding by varying ionic strength accomplishes the same function. In the case of an absorbent substrate, such as fabric, the cyclic nature of the dipping process can lead to a degree of carryover from the rinse baths to the subsequent polyelectrolyte solutions. This carryover can induce an observable change in the pH of the polyelectrolyte solutions, which may be unacceptable in certain cases. Additionally, long sample preparation times can allow the pH of the polyelectrolyte solution to drift, as evaporation and concentration of the solution occurs.

In an effort to eliminate rinse water contamination, robotic modifications have been made to dipping systems. One such modification involves spraying the sample with water, which immediately drains away. Since the contaminated water drains away, and is not left in the rinse bath, the likelihood of contamination and swelling of the film between alternating depositions is lessened.

As stated above, the traditional Layer by Layer process is very time consuming. In the dipping method, polymer chains must diffuse to the charged surface once a depletion layer is developed by adsorption of nearby molecules. Thus, there exists a diffusion time scale, which is inversely proportional to the diffusivity of the polyelectrolyte through the solvent, limiting the rate of deposition.

This characteristic time increases with decreasing diffusivity values, commonly seen with larger molecular weight molecules.

A less time consuming method of performing layer by layer deposition is needed. However, such a method cannot reduce the quality or uniformity of the layers that are deposited, since these factors are critical. Additionally, methods performing layer by layer deposition on substrates having large surface areas or three dimensions are also required.

SUMMARY OF THE INVENTION

The problems of the prior art have been overcome by the present invention, which comprises an automated apparatus capable of spray depositing polyelectrolytes layer by layer (LbL) with minimal or no human interaction. In certain embodiments, the apparatus sprays atomized polyelectrolytes onto a vertically oriented substrate. To counteract the effects of irregular spray patterns, the substrate is preferably slowly rotated about a central axis. In certain embodiments, the apparatus also includes a forced pathway for the droplets, such as a pathway created by using a vacuum. In this way, a thicker or three-dimensional substrate can be coated. In certain embodiments, the modular apparatus is designed so as to be scalable. In other words, through the use of multiple instantiations of the apparatus, a large or irregularly shaped substrate can be coated. Rolls of textile can therefore be coated using the apparatus. Additionally, the present invention includes a method to uniformly coat a substrate, such as a hydrophobic textile material, using aqueous solutions of polyelectrolytes.

DETAILED DESCRIPTION OF THE INVENTION

Figure 1:
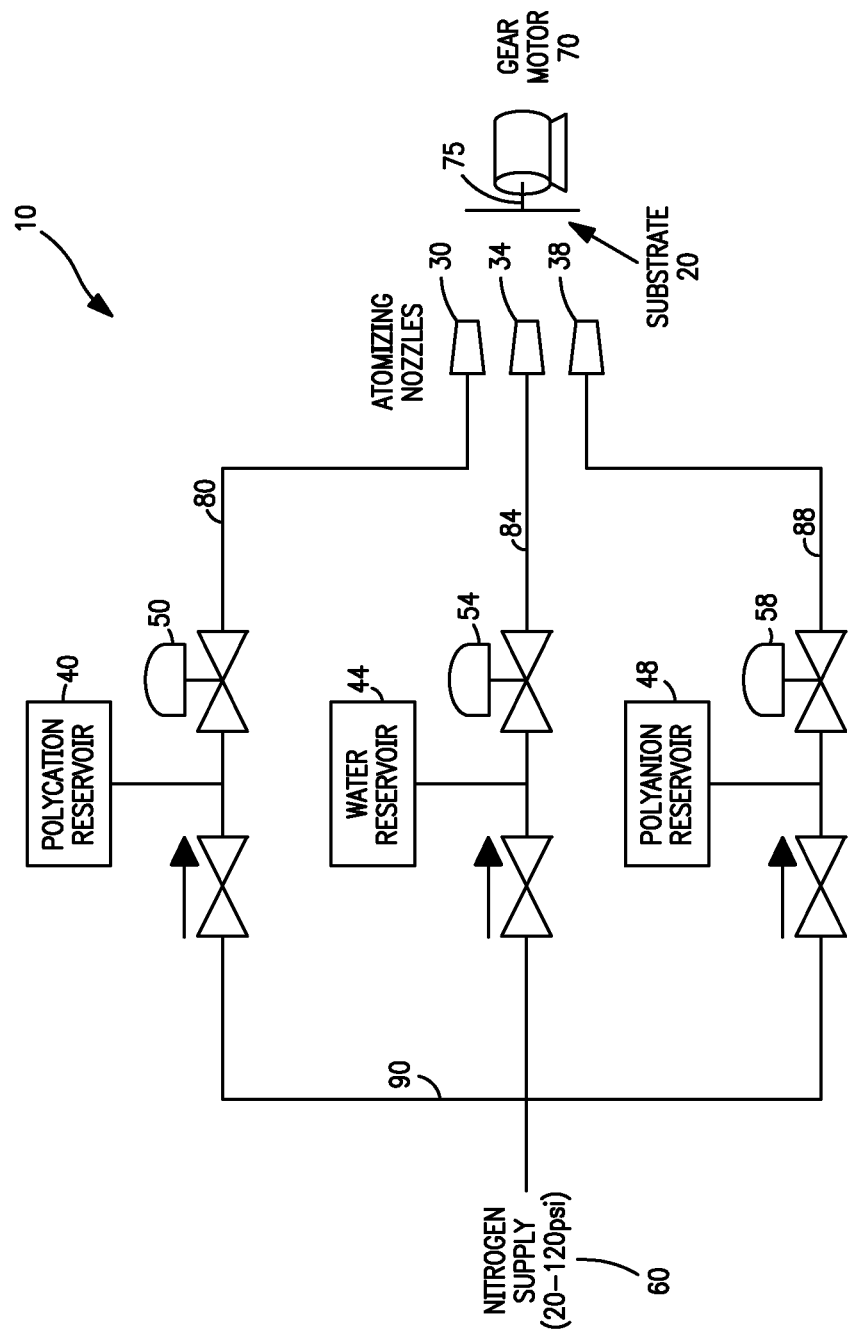
FIG. 1 illustrates a first embodiment of the apparatus of the present invention.

FIG. 1 represents one embodiment of the present invention. An automated spray system 10 is depicted which can be used to coat substrate 20 using a layer by layer methodology. In the preferred embodiment, at least three atomizing nozzles 30, 34, 38 are used to spray the substrate 20. Each of these nozzles is in communication with a corresponding reservoir 40, 44, 48. These reservoirs are used to hold the materials that are conventionally held in baths for traditional LbL dipping processes. Thus, polyelectrolytes of opposing charge are held in two of the reservoirs 40, 48, while the remaining reservoir is used to hold water or other suitable fluid for the rinse cycle. Those skilled in the art will appreciate that although reservoirs 40, 44 and 48 are shown, other embodiments can be used that provide each nozzle in communication with a suitable supply of appropriate fluid. Preferably, the rinse fluid used is deionized water (DI). The contents of these reservoirs are pressurized, such as by using gas, preferably inert gas, such as nitrogen, argon or other suitable gases not deleterious to the fluids used or to the apparatus. The pressure at which the gas is maintained affects the droplet size and flow rate and preferably is in the range of from about 20 to about 120 psi, most preferably about 50-70 psi. The output from each of these pressurized reservoirs feeds one side of a switching device, preferably a solenoid controlled valve. Thus, when the solenoid is charged, pressurized material flows from the corresponding reservoir through the valve and through the atomizing nozzle. Conversely, when the solenoid is not charged, there is no fluid flow.

Each of these solenoids is preferably controlled by a microcontroller (not shown). A single microcontroller can be used to control each device, or one or more devices can have a dedicated microcontroller. The microcontroller is adapted to generate and output signals used to operate the solenoids. The microcontroller is preferably programmed to activate and deactivate the three solenoids in a fixed sequence, with a specific time duration for each. For example, a cycle can comprise a pulse of fixed duration that charges the polycationic solution solenoid 50, followed by a pulse of fixed duration for enabling the rinse fluid solenoid 54, followed by a pulse of fixed duration for enabling the polyanionic solution solenoid 58, followed by a second pulse of fixed duration for the rinse fluid solenoid 54. Preferably, the microcontroller is programmed in small time intervals, such as 10 milliseconds, so as to produce pulses ranging in duration from 10 milliseconds to many seconds or minutes. Similarly, the duration between the deactivation of one solenoid to the activation of the next solenoid is also programmable, typically within the same ranges as stated above. While the preferred embodiment enables one nozzle at a time, the invention is not so limited. Through the use of a microcontroller, the sequencing of the solenoids is completely programmable. For example, other scenarios, such as spraying the polyanionic and polycationic material simultaneously by concurrently enabling the corresponding solenoids, are also possible. In the preferred embodiment, these time durations are predetermined and programmed within the microcontroller. The duration of the spraying is sufficiently long so as to create the required layer thickness, such as 3 seconds. Similarly, the duration of the rinse is sufficiently long so as to adequately remove all unattached material, such as 10 seconds.

In the preferred embodiment, the substrate 20 is vertically oriented, so as to allow the sprayed material to naturally drain from it, due to gravitational force. However, the use of multiple nozzles has the potential to create irregular spray patterns. Therefore, to counteract this effect of possible irregularities in the nozzle spray pattern, the substrate 20 is preferably rotated about a horizontal axis 75, wherein the axis is preferably perpendicular to the nozzle. This rotation is performed by any suitable means, such as a gear motor 70. The rotational speed of the motor is preferably very low, so as not to introduce significant centrifugal forces onto the substrate. Rotational speeds of less than 20 revolutions per minute are preferred, with speeds of 10 RPM most preferred. As stated above, the purpose of the rotation is to overcome any spray pattern irregularities over the entire surface area of the substrate. Thus, the time duration of the spray, the diameter of the spray pattern and the diameter of the substrate all affect the recommended RPM. In other words, for larger diameter substrates (assuming a constant spray pattern diameter), either the spray duration or the RPM may be increased to insure uniform coating. Alternatively, the substrate may remain stationary, while the nozzles are moved so as to overcome any irregularity of spray pattern. Finally, both the substrate and the nozzle can be moving; the preferred embodiment only requires that there be relative motion between the substrate and the nozzles.

Finally, to avoid contamination, all plumbing, including valve bodies, and hoses 80, 84, 88, 90 is preferably constructed of poly(propylene), although other materials not deleterious to the process such as stainless steel, polyurethane, Delrin, PVC, polypropylene are also suitable.

In operation, the gas supply 60 is enabled, thereby pressurizing all three reservoirs. All of the solenoids 50, 54, 58 begin the process in the closed position, so that no material is being spraying toward the substrate 20. Following activation, the microcontroller begins to perform the programmed cycle. A signal is asserted by the microcontroller which causes cationic solenoid 50 to open. This allows material from the polycationic reservoir 40 to pass through the solenoid and to the corresponding atomizing nozzle 30. Atomizing nozzles are well known in the art and will not be described in great detail. A suitable nozzle is the M series of nozzles, commercially available from Hago Nozzles. The polycationic material is then sprayed onto the slowly rotating substrate. The duration of time that polycationic solution is sprayed onto the substrate can be predetermined and programmable, and depends on the material and substrate used. As stated earlier, the rotation of gear motor 70 causes the substrate to rotate slowly, allowing the material to more evenly be distributed on the substrate. After the predetermined time interval, the microcontroller deasserts the signal to the solenoid 50, thereby causing the flow of cationic material to stop. After a second predetermined time has elapsed, the microcontroller asserts the signal enabling the rinse fluid solenoid 54. This enables rinse fluid from the rinse fluid reservoir 44 to pass through to atomizing nozzle 34. Rinse fluid is then sprayed onto the rotating substrate to remove residue. The duration of the rinse cycle can be predetermined and is programmable and is an implementation choice. Following the lapse of another predetermined amount of time, the microcontroller asserts a signal enabling the polyanionic solenoid 58. This enables material from the polyanionic reservoir 48 to pass through to atomizing nozzle 38 and onto rotating substrate 20. After the polyanionic material has been sprayed for the predetermined period, rinse fluid solenoid 54 is again energized, allowing a second rinse fluid rinse to occur. This completes one cycle of the LbL process.

In one embodiment, the polycation solutions was sprayed for 3 seconds each, followed by a 17 second period in which the substrate was allowed to drain. The rinse fluid was then sprayed for 10 seconds, and allowed to drain for 10 additional seconds. The polyanion solution was then sprayed for 3 seconds, followed by a 17 second draining period. It should be noted that although this example began with polycationic material, the invention is not so limited. The choice of which solution begins the cycle is based on the original substrate surface charge. The completion of one polyanionic spray, one polycationic spray and two rinse sprays constitutes a complete cycle.

The distance between the output of the atomizing nozzles 30,34,38 and the substrate may be variable. In other words, it may be beneficial, based on the size and shape of the substrate and the ionic materials to be sprayed, to vary the distance between the nozzle and the substrate. In one embodiment, the atomizing nozzles are mounted on a slidable frame, so that their position in the horizontal direction can be modified. In a second embodiment, the gear motor 70 is mounted on a slidable frame so as to vary its position. The use of frames helps to maintain the relative alignment in the other two dimensions, while the distance is varied. Although not limited by any particular distance, distances of less than 10 inches are preferred.

Several modifications are possible to the preferred embodiment shown in FIG. 1. For example, rather than 3 separate nozzles, a single nozzle may be used. In such an embodiment, hoses 80, 84, 88 all converge into a single nozzle or other suitable means is used to provide fluid communication between nozzle and the sources of polyions and rinse fluid. This eliminates possible deviation caused by differences in nozzle spray pattern, or the position of the nozzle.

Although air-assisted atomizing nozzles are described with respect to FIG. 1, the invention is not so limited. Any device which can be used to atomize the material is suitable. For example, ultrasonic-assisted atomization, ultrasonic-assisted atomization, and piezoelectric-assisted atomization are all known in the art and within scope of the present invention.

The modularity of the present invention readily allows for scalability. For example, for a sufficiently large substrate, two or more instantiations of the apparatus of FIG. 1 can be used. Preferably, a single microcontroller can be used to control the device. For example, a second set of atomizing nozzles can be added and located above, below or adjacent to the existing set, thereby allowing a much larger spraying area.

Figure 2:
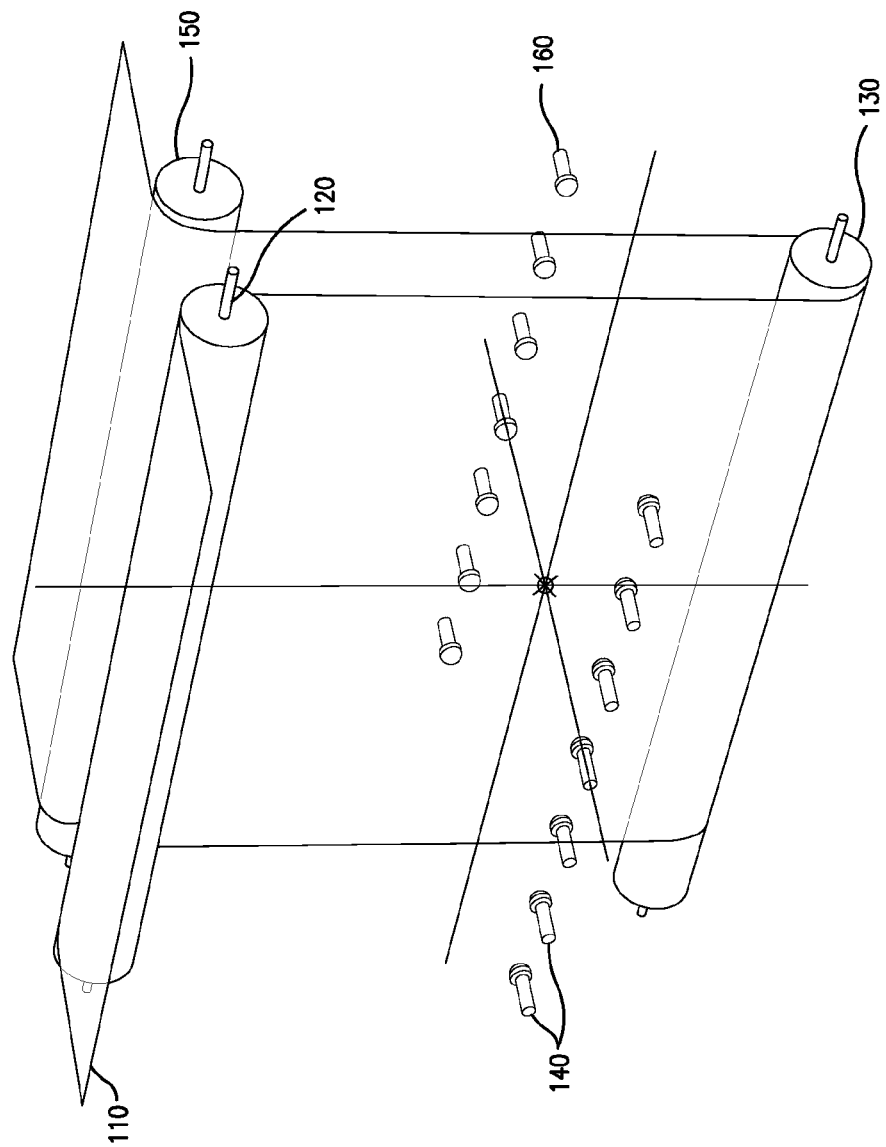
FIG. 2 illustrates a second embodiment of the apparatus of the present invention used for roll-to-roll processing.

Alternatively, multiple instantiations of the apparatus can be arranged to readily spray large bolts of material in a roll-to-roll process. FIG. 2 shows one such embodiment. The material used can be of various types, including but not limited to cotton textiles, nylon, polyester, and heavy cotton canvas. In this configuration, material 110 is fed through roller 120 downwards toward roller 130. Positioned between roller 120 and roller 130 is a plurality of nozzles 140, preferably arranged in a straight row. These nozzles 140 are adapted to spray polycationic material. The duration of time that the material 110 is subjected to the spray is determined by the speed at which the rollers move the material 110 past the nozzles 140. In one embodiment, roller 130 is positioned within a bath (not shown) that contains rinse fluid. In an alternate embodiment, a second set of nozzles can be used to spray rinse fluid onto the material 110. After the material exits the rinse bath, it travels upward toward roller 150. Positioned between roller 130 and roller 150 is a second set of nozzles 160, adapted to spray polyanionic material onto the material 110. Again, the duration of time that the material 110 is subjected to the spray is determined by the speed at which the rollers move the material 110 past the nozzles 160. The material then passes over roller 150. Typically, more than one layer is applied. In one embodiment, the configuration of rollers and nozzles shown is replicated multiple times to allow the material to be exposed to the desired number of cycles. In another embodiment, the material is configured as a continuous loop, whereby the material is passed through the configured nozzles and rollers multiple times. Finally, it should be noted that the scalability of the nozzles allows a variety of configurations to be used for performing the spraying of roll-to-roll materials. While the description above described one such embodiment, it should be noted that other configurations of the nozzles and rinse baths are also possible and are within the skill in the art. Therefore, the present invention is not limited to the embodiment shown in FIG. 2. Also, although the preferred embodiment sprays polycationic fluid first, followed by a rinse fluid bath, and followed by a polyanionic spray, the invention is not so limited. As stated above the order of operations can be varied, and the polycationic and polyanionic sprays can also be applied simultaneously, if desired.

Figure 3:
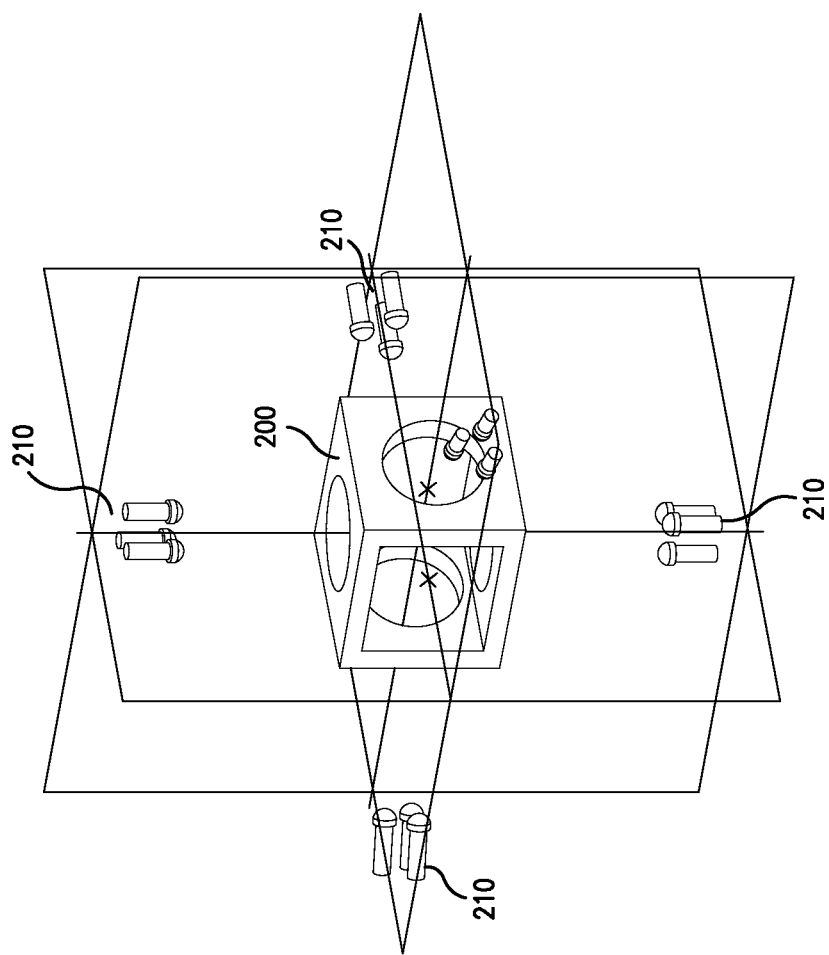
FIG. 3 illustrates a third embodiment of the apparatus of the present invention preferably used for three dimensional substrates.

While FIG. 2 illustrates the use of multiple instantiations of the apparatus to spray a larger two-dimensional area, the invention is not so limited. FIG. 3 shows that the multiple instantiations of the apparatus can be placed in other orientations, such as perpendicular to one another, so as to enable the spraying of a three dimensional substrate 200. The substrate is positioned between the nozzles 210, and may be held in position of a wire, a guide rail, string or other suitable means. The exact positioning of the nozzles 210 is an implementation design choice. In one embodiment, a sufficient number of nozzles 210 are utilized so as to insure that the entire surface of the substrate 200 can be covered. The nozzles are then positioned so as to achieve this objective. In this case, the substrate may optionally be rotated. However, since the nozzles are able to spray the entire surface of the substrate 200, rotation of the substrate is not required. In a second embodiment, the substrate can be rotated so as to insure that spraying of the entire surface area of the substrate is achieved. This may be necessary due to the shape of the substrate, or alternatively, the number and position of the nozzles may be such that complete coverage of the surface area of the substrate is not achieved without rotation. This embodiment offers the advantage of fewer nozzles, but requires relative motion between the substrate 200 and nozzles 210. In a third embodiment, the substrate 200 is held stationary, while the nozzles 210 are moved about the substrate 200 so as to spray the entire substrate. The nozzles may be positioned on rails, or other suitable means to perform this required movement. It should be noted that FIG. 3 shows 5 sets of nozzles, positioned above the substrate, below the substrate and at 120° angles about the center of the substrate in the horizontal plane. This arrangement is not required by the present invention, and either fewer or a greater number of nozzles can be used. In fact, a single set of nozzles can be utilized if the nozzles (or substrate) are moved so as to allow the nozzle to spray the entire surface area of the substrate.

Figure 4:
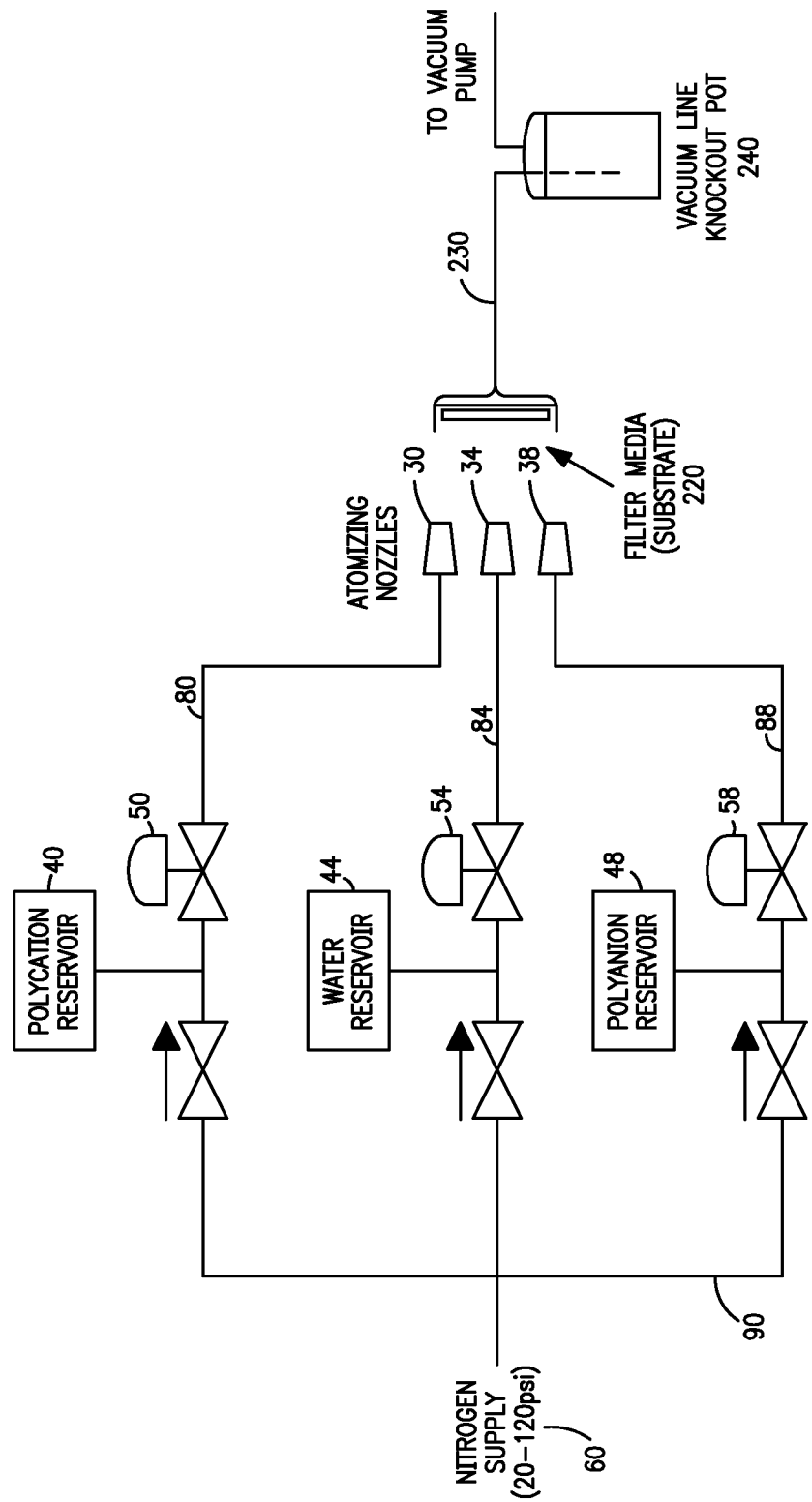
FIG. 4 illustrates a fourth embodiment of the apparatus of the present invention.

FIG. 4 illustrates another embodiment of the present invention, where a porous substrate 220, such as a filter, is being sprayed. To insure that the sprayed material penetrates the entire substrate 220, external means are used to force the sprayed material to pass through the substrate material. In the preferred embodiment, a vacuum is created behind the substrate 220, so as to force the sprayed material to pass through the substrate. This vacuum can be created using a variety of methods, which are within the skill in the art. In one embodiment, a vacuum pump is used (not shown). Residual sprayed material that passes through vacuum hose 230 is deposited in a suitable storage container, such as a knockout pot 240. The addition of the vacuum allows thorough penetration of the sprayed material. The vacuum draws the solution through the substrate, such as a filter mesh, conformally coating the interstitial passages of the mesh with alternatively charged species. Alternatively, rather than "pulling" the sprayed material through the porous substrate 220, it can be "pushed". In one embodiment, the gas is pressurized at a higher pressure, so as to force the sprayed material to exit the nozzle at an increased velocity. In another embodiment, several sets of nozzles are used, each set at a different distance from the substrate. Possible applications of this technology include passivation of a stainless steel filter mesh toward electrochemical degradation or for use as a porous catalyst support, or reactive functionalization of an air filter to bind or react specific noxious vapors. Thus, this application method is not limited to the 2-dimensional surface of a thin film, but can thoroughly functionalize the vast surface area of a filter while maintaining the rapid, uniform deposition shown by the previous Spray-LbL technique.

Sprayed deposition presents several advantages over traditional dipped deposition. It allows for considerable decrease in process time. As stated earlier, dipped depositions of 25 or more layers can take in excess of 12 hours. In contrast, the apparatus of the present invention can typically produce 25 layers in less than 30 minutes; an improvement of 2500%. Furthermore, atomization of the solution immediately prior to contact with the substrate allows for uniform coating of extremely hydrophobic surfaces, even using aqueous solutions of charged species. This apparatus can be used to spray various materials, including but not limited to traditional weak and strong polyelectrolytes, hydrogen bonded films, dendrimers or hyperbranched compounds, and colloidal metal oxide nanoparticles such as titanium dioxide, aluminum dioxide and cerium dioxide. Furthermore, the present apparatus can be used to coat various substrates, including but not limited to silicon, flexible plastic sheeting, DuPont® Tyvek®, cotton textile, and glass, such as windshields and headlight diffusers.

To demonstrate the effectiveness of the present apparatus, a number of test were performed.

In one test, two pairs of polyelectrolytes were chosen including a pair of strong polyelectrolytes, poly(sodium 4-styrene-sulfonate) (SPS) and poly(dimethyldiallylammonium chloride) (PDAC), as well as a pair of weak polyelectrolytes, poly(amidoamine) (PAMAM) and poly(acrylic acid) (PAA). PAMAM was specifically selected to test the capabilities of spraying a dendritic molecule as well.

Poly(sodium 4-styrene sulfonate) (SPS) of molecular weight 1,000,000, poly(dimethyldiallylammonium chloride) (PDAC) molecular weight 100,000, and sodium chloride were purchased from Aldrich. Poly(ethylene imine) (LPEI) molecular weight 25,000, poly(acrylic acid) (PAA) molecular weight 20,000, and polyethylene oxide (PEO) molecular weight 100,000 were purchased from Polysciences. Poly(amido amine) dendrimer (PAMAM) generation 4, $NH_2$ surface, 22 wt % in methanol, was purchased from Dendritech. All chemicals were used as received. Polymer solutions were made using DI water at a concentration of 20 mmol with respect to the repeat unit. Solutions were adjusted to the required pH using HCl or NaOH. The ionic strength of the PDAC and SPS solutions was 0.1 mol NaCl. The hydrogen bonded nature of the PEO/PAA films required careful attention to the pH of both solutions which must not vary more than 0.05 from the desired value. Spray-LbL tests were conducted on three and four inch diameter silicon wafers (Silicon Quest International), while dipped LbL tests were conducted on similar wafers which had been broken into 1 cm by 5 cm pieces. All silicon was cleaned with methanol and Milli-Q water, followed by a five minute oxygen plasma etch (Harrick PCD 32G) to clean and hydroxylate the surface. Four inch diameter Tyvek swatches were cut from unused laboratory coats (VWR) and were used as received.

Figure 5:
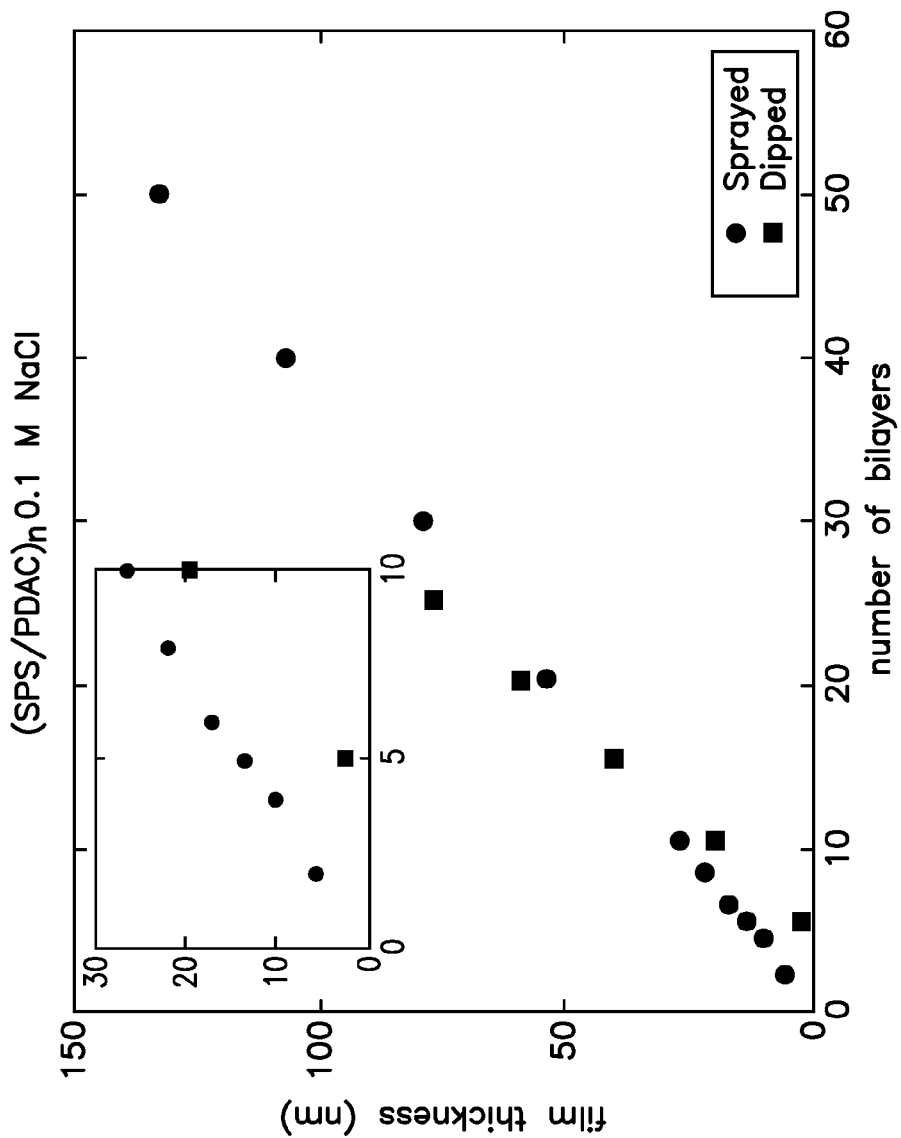
FIG. 5 illustrates a graph showing the growth trend for a $(SPS/PDAC)_n$ system using both dipped and sprayed LbL deposition.

The growth trend of $(SPS/PDAC)_n$ films constructed by dipping as well as by spraying can be seen in FIG. 5.

Dipped film assembly was automated with a Carl Zeiss HMS DS-50 slide stainer. The silicon substrates were first exposed to the polycation solution for 10 minutes followed by three rinse steps in Milli-Q water for a total of 2 minutes. For the PAMAM/PAA and LPEI/PAA depositions, the Milli-Q water was titrated to pH 4.0 using hydrochloric acid, otherwise the Milli-Q water was used at its default pH. The substrate was then exposed to the corresponding polyanion solution and rinsed similarly. The cycle was repeated for the required number of layer pairs requiring approximately 11.5 hours to complete a 25 layer pair film. Sprayed films were deposited using identical solutions and rinse pH values. All solutions were delivered by ultra high purity Argon (AirGas) regulated to 50 psi. The polycation was sprayed for 3 seconds and allowed to drain for 17 sec. before spraying with water for 10 sec. After a 10 second draining period the polyanion was sprayed and rinsed similarly. The cycle was then repeated for the desired number of layer pairs resulting in a 33 minute process to deposit a 25 layer pair film.

One important consideration was the initial period of film growth, such as during the first 5-10 layer pairs. It is common in solution based LbL dipped depositions to observe an initial non-linear growth regime, which typically lasts through the first three to five layer pairs. After this point, a steady-state, linear growth phase is typically achieved. This initial regime is generally explained by roughness or uneven charge distribution of the substrate. Also, current research has shown that LbL dipped deposition is not solely a surface process, but rather that the bulk film participates, resulting in some degree of interdigitation between layer pairs. This phenomenon is particularly true for superlinearly growing LbL systems, in which case during the first few layer pairs there is no bulk film into which adsorbing polyion can penetrate. As a result, research has shown that substantial growth does not appear to commence until several cycle repetitions have been completed.

This non-uniform initial regime phenomenon can be seen in the growth trend of the dipped $(PDAC/SPS)_n$ films, which appeared to begin steadily growing by the time the process has completed 5 cycles, as shown in FIG. 5. Before the fifth cycle, the total film thickness was nearly zero. However, after this initial period the dipped films grew linearly at a rate of 3.8 nm per layer pair. In contrast, the sprayed films did not exhibit any initial non-linear growth regime. Film thickness grew linearly with number of layer pairs, and at the slightly lower rate of 2.7 nm per layer pair (in this case, sprayed layers were 77% of the thickness of dipped layers). Thus, in the case of $(PDAC/SPS)_n$, spray deposition can be used to suppress the initial nonlinear growth regime common with dipped deposition.

AFM images of the initial bilayer of PDAC/SPS deposition in the spraying case and dipping case were taken and compared. These thickness measurements for growth curves were performed on a Woolam XLS-100 Spectroscopic Ellipsometer, and checked using a Tencor P10 profilometer by scoring the film and profiling the score. A stylus tip force of 6 mg was used during profilometry to avoid penetrating the polymer film. ESEM analysis was performed on a FEI/Phillips XL30 FEG ESEM. Micrographs were taken at operating pressures between 0.9 and 1.5 mbar with a spot size of 3.0. Atomic Force Microscopy was conducted using a Digital Instruments Dimension 3100 in tapping mode at an amplitude set point of 0.8 V under dry conditions. In order to obtain high-resolution images, supersharp Si probes (Pacific Nanotechnology, SSS-NCH) were used to capture the image. Height and phase images were taken at scanning rates of approximately 1.5 Hz.

During adsorption by dipping, AFM imaging showed that PDAC adsorbs initially in clumps, or "islands". This in turn influenced the morphology of the following SPS layer. As deposition continued, the islands were eventually bridged and even deposition occurred, reaching the steady-state growth regime. In contrast, during spray deposition no large islands of PDAC or SPS appeared during the first layer pair deposition. Images showed smooth surfaces with little coverage. The roughness of large islands that resulted in the initial growth regime during the dipping process was not a factor here.

As a consequence of the short exposure time of the polyion to the substrate during spraying, equilibrium cannot be reached. Therefore, less material was necessarily deposited. However, the fact that thick films were grown demonstrated that a 3 second spray of polyion was adequate for charge reversal to occur.

$(SPS/PDAC)_n$ is known to be one of the most stratified LbL systems. Therefore it is reasonable to assume that uneven charge density on the substrate, and thus roughness of initial layers, has the greatest influence on the initial growth (as opposed to lack of bulk film). In other words, the deposition of each successive layer is most influenced by the topography/charge density of the underlying layers. The AFM images showed that spraying produced thinner and smoother surfaces during the first layer pair, leading to linear growth from the outset. This could be simply due to the shorter deposition time, meaning that "islands" were still formed, but they were much smaller than in the dipped case. Alternatively, this result may be due to the fact that polyelectrolyte was introduced evenly and simultaneously to the entire substrate, before quickly draining away. Thus, the polymer chains were kinetically trapped to the point of contact with the substrate, whereas during dipping the chains were allowed to diffuse and complex with regions of higher charge density on the surface. This could also explain the smoother initial layer pairs measured for the spraying case. The difference in the initial growth suggested that the spray method is preferable for making very thin and uniform layers of strong polyelectrolytes.

While PDAC and SPS were used above, the invention is not limited to only these solutions. Other suitable polycations include, but are not limited to, poly(dimethyldiallylammonium chloride), poly(ethyleneimine), poly(allylamine hydrochloride), polyaniline, polypyrrole and poly(vinylbenzyltriamethylamine). Other suitable polyanions include, but are not limited to, poly(sodium 4-styrenesulfonate), poly(acrylic acid), Nafion, poly(methacrylic acid), poly(sodium styrene sulfonate), and sodium poly(styrene sulfonate).

Additionally, clay platelets, such as montmorillonite and bentonite, may be used.

Similar experiments were conducted using both dipped and sprayed films of $(PAMAM/PAA)_n$ assembled at pH 4. The growth trends of both dipped and sprayed films can be seen in FIG. 6. In this case, an introductory non-linear growth period was observed using either deposition method. Interactions in the case of weak polyelectrolyte are known to be more complicated, and the branched geometry of PAMAM also played a factor. At pH 4, the tertiary amine groups in the dendrimers' interior were only partially protonated and therefore hydrophobic. Due to van der Waals forces between the interiors, PAMAM molecules will tend to aggregate on a weakly charged surface. Once the PAA layer was uniform, the stronger charge density plus the favorable interaction of carboxylic acid groups with primary amines was sufficient for uniform layer deposition. PAA is known to become more charged in the presence of positively charged amine containing polymers, making the interaction between the polyions even more energetically favorable.

In this case, film assembly was similar in both cases, with growth rates of 210 and 224 nm per layer pair for dipping and spraying respectively (sprayed layers are 107% of the thickness of dipped layers). AFM images of the first layer pair of sprayed PAMAM/PAA and of dipped PAMAM/PAA showed similar topologies. The AFM images indicated that in both cases the initial PAMAM layer deposited in aggregates of dendrimer. These aggregates were smaller in the sprayed case, again most likely because of shorter exposure time to the substrate. The surface after the first exposure to PAA in both cases showed more complete coverage. Spraying therefore can be used to create a denser, but still incomplete, monolayer of dendrimer aggregates.

Figure 6:
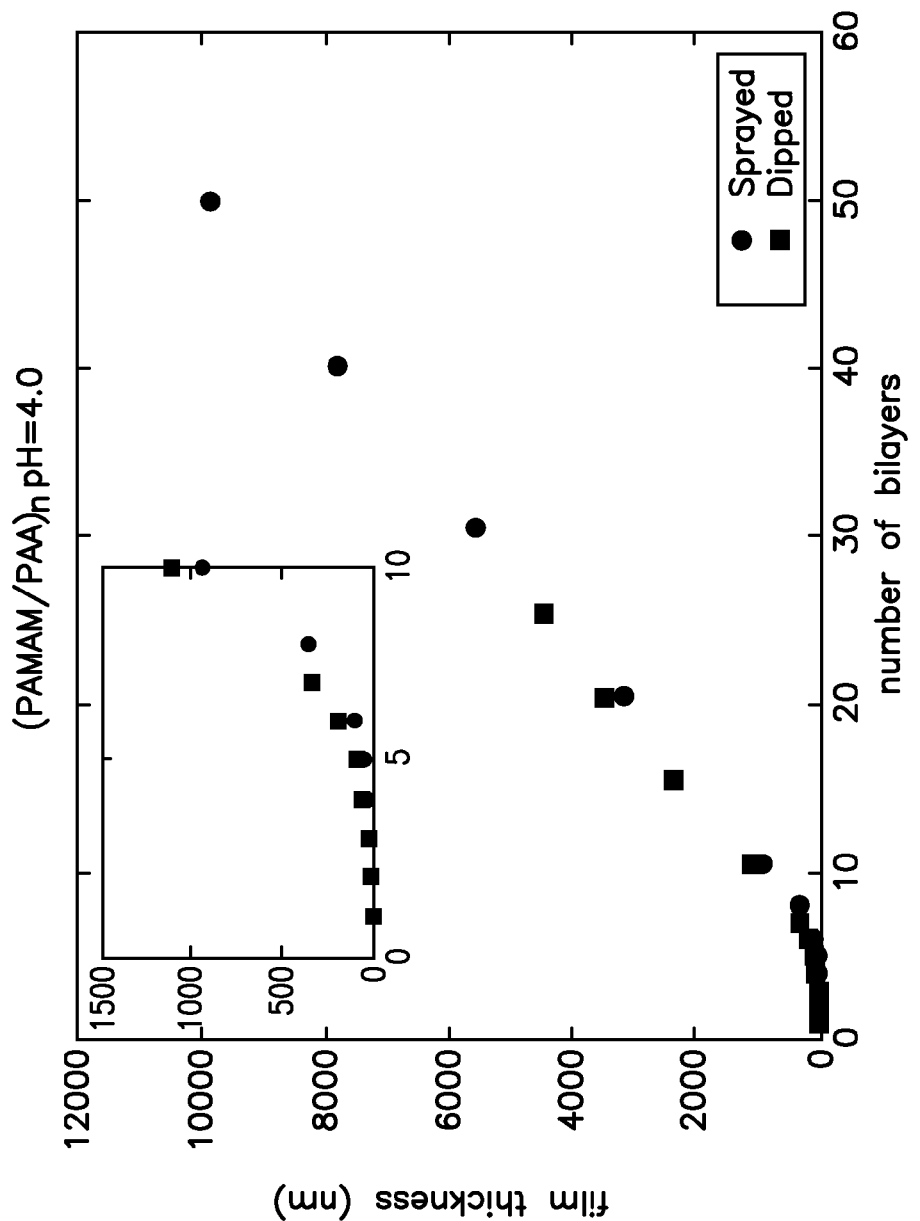
FIG. 6 illustrates a graph showing the growth trend for a $(PAMAM/PAA)_n$ system using both dipped and sprayed LbL deposition.

The linearity of the spray deposition in FIG. 5 and FIG. 6 can be attributed to the physical mechanism behind spray-LbL deposition. In certain polyelectrolyte systems, either the polycation or the polyanion, or both, has the ability to diffuse throughout the film. It has been proposed that in these cases during the deposition period not only do polyions adsorb to the polyelectrolyte multilayer (PEM) surface, but chains also diffuse into the previously deposited PEM structure, building up an effective reservoir. During the successive exposure to the oppositely charged polyion, this reservoir is drawn to the PEM surface, creating more available material with which the adsorbing polyion can complex, and leading to a super-linear growth rate. Assuming a similar growth mechanism, the spray method should therefore minimize interlayer diffusion. The film is hydrated throughout the process, so the chains will still have some mobility, but diffusion of long molecules takes time, which is considerably shorter for spraying than it is for dipping. For systems that have been observed to grow super-linearly, it could be expected that spraying would reduce this effect. The highly charged nature of PAMAM molecules would imply the deposition of a tightly ionically crosslinked film composed of very flat layers exhibiting little interpenetration. With very little interpenetration, dipped and sprayed films grew at very similar rates.

Dendrimer encapsulated nanoparticles (DEN) were also used to coat a catalytic metallic nanoparticle onto a substrate. A stainless steel mesh was used as the substrate. To insure adequate coverage of the mesh, the vacuum system described above was used in conjunction with the apparatus. PAMAM dendrimers with Paladium nanoparticles in the center of the molecules were synthesized using techniques known to one of skill in the art. PAA was used as the anionic solution. These solutions were then sprayed in layers onto the mesh using the process described above. Layers of material were therefore added to the mesh. Thus, Paladium was able to be coated onto the mesh. This mesh could later serve as a catalytic support on which to perform reaction requiring a catalyst, such as but not limited to hydrogenation reactions. While this experiment utilized Paladium, the invention is not so limited. Any catalytic metallic nanoparticle, such as but not limited to platinum or silver, can be utilized to achieve this result. Similarly, while PAMAM and PAA were utilized above, any combination of DEN and polyanionic solution would also be suitable.

Other suitable dendrimers include, but are not limited to, poly(propylene imine).

Figure 7:
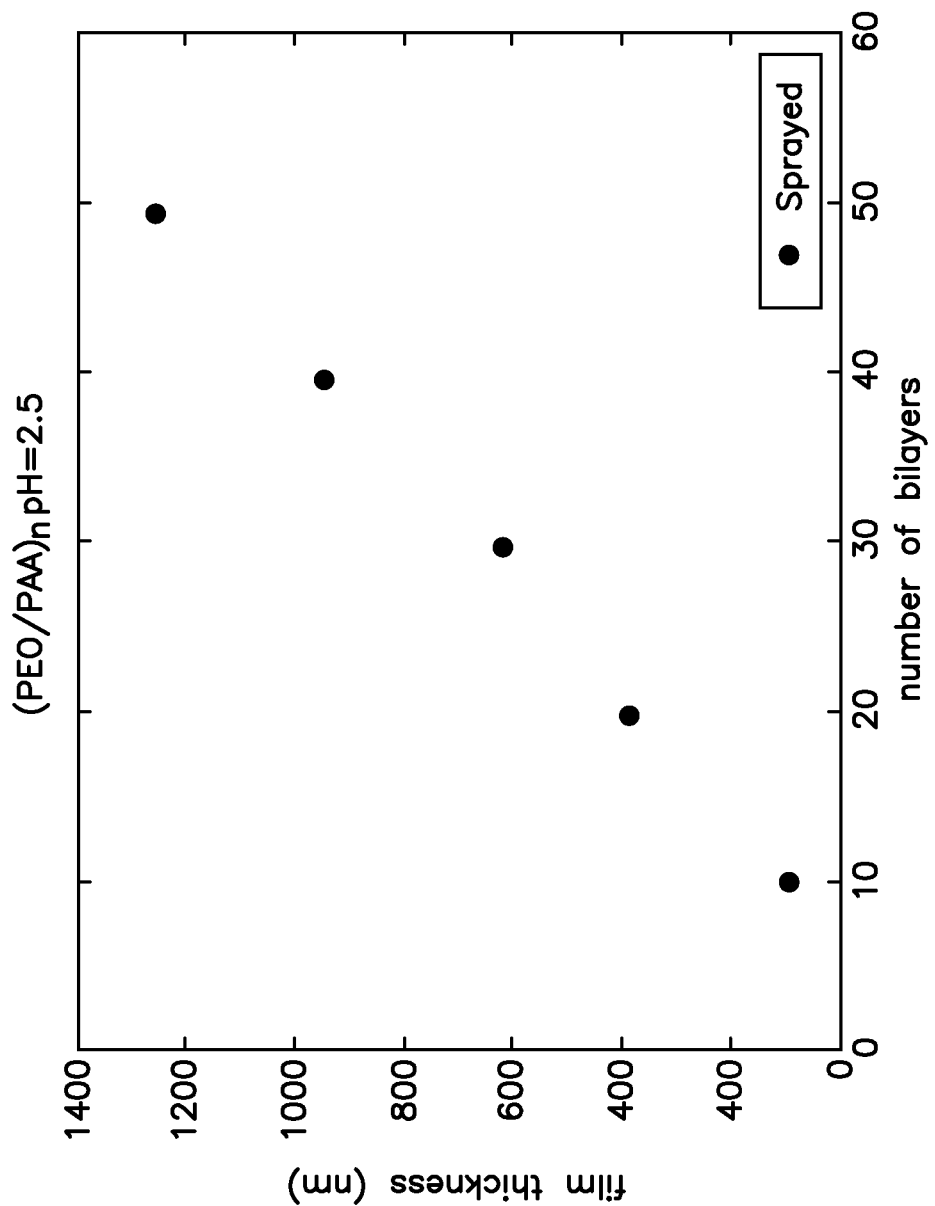
FIG. 7 illustrates a graph showing the growth trend for a $(PEO/PAA)_n$ system using sprayed LbL deposition.

Whereas Coulombic forces drive electrostatic LbL formation, hydrogen bonding can foster multilayer formation when a hydrogen-bond donor and acceptor are used. Deposition of this type is extremely sensitive to variations in solution pH. Thus the closed vessels and short deposition times inherent to the spray-LbL process, which are ideal for minimizing evaporation and controlling solution consistency, make the process well suited for hydrogen bonded systems. As expected, $(PEO/PAA)_n$ films deposited via the spray method yielded linear growth as shown in FIG. 7. Again the presence of an introductory growth period was observed. After eight cycles were completed however, growth occurred at a constant rate of 30 nm per layer pair, uniformly coating the substrate.

Figure 8:
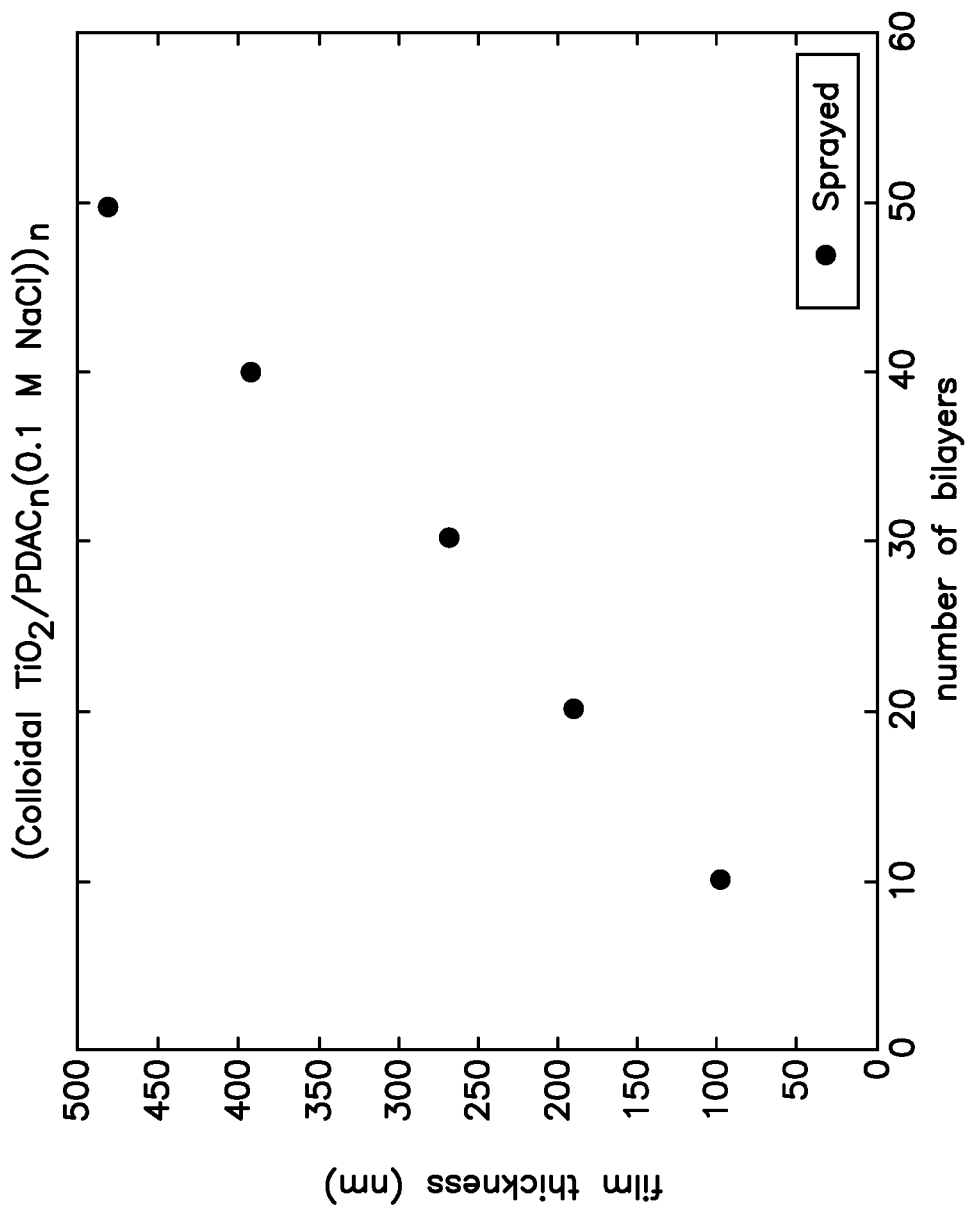
FIG. 8 illustrates a graph showing the growth trend for a $(TiO2/PDAC)$ system using sprayed LbL deposition.
Figure 9:
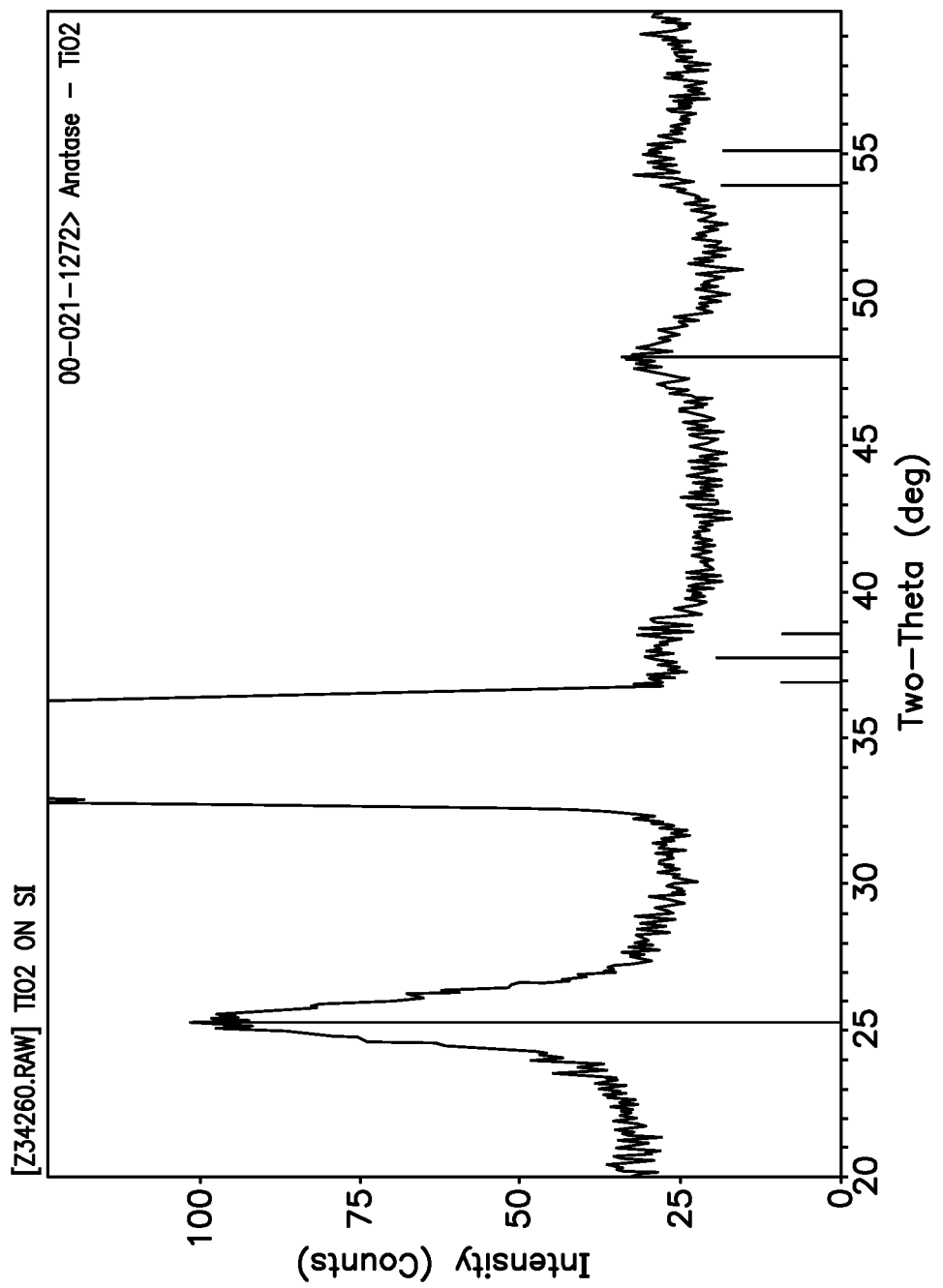
FIG. 9 illustrates the diffraction spectrum for the substrate of FIG. 8.

Spray-LbL also proved advantageous for the deposition of colloidal nanoparticles. Success was demonstrated by alternating negatively charged titanium dioxide nanoparticles with positively charged PDAC. Particles tested had mean diameter of 7 nm and Zeta-potential of roughly −34 mV. In this case, contact time between sprayed solution and substrate was more than sufficient to adhere particles and develop constant linear growth, detailed in FIG. 8, at a rate of 9.5 nm per layer pair. X-ray diffraction of a $(TiO_2/PDAC)_{50}$ film, the results of which are shown in FIG. 9, confirmed that anatase phase nanoparticles were in fact deposited in the film. Atomization immediately prior to contact with the substrate insured deposition of particles instead of agglomerates.

Other suitable colloidal nanoparticles include, but are not limited to, titania, ceria, alumina, and zirconia.

As a challenging test of the spray-LbL technique's ability to coat textile materials, DuPont® Tyvek® was selected as a substrate. Constructed by a proprietary flash-spinning technique, Tyvek® is made from very fine, high-density poly (ethylene) fibers. It is vapor permeable, yet water, chemical and abrasion resistant, making it extremely useful as a garment material for protection against hazardous environments including pesticides and herbicides. Uncoated Tyvek® is quite hydrophobic. The three dimensional texture of uncoated Tyvek® is well known; under magnification of 2000×, individual poly(ethylene fibers) can be observed. The ultra-fine mist generated as the solution exited the atomizing nozzle was capable of delivering charged species uniformly, even to a hydrophobic surface.

Microscope images showed macro scale uniformity of Tyvek when coated with 100 layer pairs of (SPS/PDAC) containing 0.10 M NaCl, typically added to increase deposition thickness. As ionic crosslinks formed between the polymer chains, salt ions were ejected, forming crystals on the surface. The short rinse time was not sufficient to dissolve the crystals, which were visible in the image. The salt was removed by soaking the coated Tyvek $(SPS/PDAC)_{100}$ in neutral pH water for a period of 15 minutes. Further magnification of the image showed that the soaking had only removed the salt crystals, leaving individually coated fibers behind. Roughness of the LbL film was seen, which was a result of salt crystals being formed during the deposition process (the salt crystals increase the surface roughness seen by each successive exposure of polyion). Longer rinse cycles (on the order of 1 minute) can be used to immediately rinse away the salt crystals, if surface roughness is not desirable. By soaking to remove the salt after deposition was complete, however, much short cycle times were achieved.

The process conformally coated the fibers even at varying depths within the surface of the material itself. Again, the ultrafine mist allowed very small droplets to transport the charged species, effectively wetting an otherwise hydrophobic material. Thus, this method was able to treat the macroscopic material with a hydrophilic coating. Contact angle can then be used to examine the hydrophobic or hydrophilic nature of the coating's surface, that it is uniform and that the surface properties of the substrate have been changed. In this example, a coating of $(LPEI/PAA)_{100}$ reduced the advancing contact angle of a droplet of water from ~150° on uncoated Tyvek to less than 110°; a change of more than 40° in wetting contact angle. Contact angle measurements were performed by the standard sessile drop technique on an Advanced Surface Technology (AST) device. The contact angles described herein are advancing contact water angles, and were made by moving the substrate vertically until contact was made between a water drop on the tip of a syringe and the sample. The subsequent addition of a small amount of water to the water drop on the surface produced the static advancing angle with the surface in a few seconds.

In summary, the layer-by-layer method can be successfully utilized to deposit thin, uniform multilayered films. Unfortunately, the conventional practice of dipping substrates into solutions and waiting for electrostatic equilibrium to occur requires long process times, on the order of hours to days for a film of 50 layer pairs. Spray-LbL has been developed as a method capable of achieving drastically reduced process times by eliminating diffusion from the mechanism, but still allowing for conformal coating of three-dimensional structures. Furthermore, elimination of mass transfer by diffusion reduces the interpenetration of layer pairs within the film leading to linear, reproducible growth rates. In the case of both strong and weak polyelectrolytes, uniform deposition occurred much more quickly than with dipping, making spraying an attractive option for making extremely thin but uniform films. Spray-LbL was capable of depositing several systems in which the driving force of film assembly was not electrostatic. It was also applied to spray deposit inorganic nanoparticles.

Spray-LbL deposition was used to deposit multilayer films on Tyvek, a hydrophobic textile material, from aqueous suspensions of polyelectrolytes. The ultra-fine mist produced from the apparatus was capable of transporting the charged species in such a manner that individual fibers within the material were conformally coated, resulting in a marked change in the material's hydrophilicity.

This technology decreased the process times required by conventional LbL techniques by more the 25-fold, while allowing for conformal coating of three-dimensional substrates with virtually no human interaction. This technology can also be scaled. The technology can be configured as an array capable of coating areas having large or irregular substrate surface areas, thereby making spray-LbL technology attractive on an industrial scale.

What is claimed:

1. Apparatus for layer-by-layer film deposition on a charged surface of a substrate, comprising:
   a first reservoir configured to contain a first solution and in fluid communication with a first nozzle;
   a second reservoir configured to contain a second solution and in fluid communication with a second nozzle;
   a third reservoir configured to contain a rinsing fluid and in fluid communication with a third nozzle; and a vacuum pump configured to apply a vacuum behind the substrate and provide a forced pathway for droplets ejected from the first, second, and third nozzles, wherein:

the first nozzle is configured to spray the first solution on said charged surface, thereby forming on said surface a first layer having a charge opposite the charge on said charged surface;

the second nozzle is configured to spray the second solution on said first layer, thereby forming on said first layer a second layer having a charge opposite the charge of the first layer;

the third nozzle is configured to spray the rinsing fluid toward said charged surface; and a source of gas is configured to pressurize the first reservoir, second reservoir, and third reservoir, wherein the source of gas is configured to affect the droplet size and flow rate emerging from the first, second, and third nozzles, and wherein the first solution comprises polyelectrolytes and the second solution comprises nanoparticles, and wherein the apparatus is configured to conformally coat the substrate.

2. The apparatus of claim 1, wherein the first, second, and third nozzles are configured to be less than 10" from the substrate.

3. The apparatus of claim 1, wherein the apparatus is configured for coating a three-dimensional substrate.

4. The apparatus of claim 1, comprising a switching device in fluid communication with the first, second, and third reservoirs.

5. The apparatus of claim 1, wherein relative motion exists between at least one of the first, second and third nozzles and the substrate.

6. A method for forming a layer-by-layer film on a substrate, the method comprising applying successive layers of materials to the substrate using the apparatus of claim 5.

7. The apparatus of claim 1, wherein the apparatus is configured to coat rolls of textiles.

8. A method for forming a layer-by-layer film on a substrate, the method comprising applying successive layers of materials to the substrate using the apparatus of claim 7.

9. The apparatus of claim 1, wherein the substrate is vertically oriented and the apparatus comprises a motor for rotating the substrate around a horizontal axis.

10. A method for forming a layer-by-layer film on a substrate, the method comprising applying successive layers of materials to the substrate using the apparatus of claim 9.

11. A method for forming a layer-by-layer film on a substrate, the method comprising applying successive layers of materials to the substrate using the apparatus of claim 1.

12. A method for forming a layer-by-layer film on a substrate, the method comprising applying successive layers of materials to the substrate using the apparatus of claim 2.

13. A method for forming a layer-by-layer film on a substrate, the method comprising applying successive layers of materials to the substrate using the apparatus of claim 3.

14. A method for forming a layer-by-layer film on a substrate, the method comprising applying successive layers of materials to the substrate using the apparatus of claim 4.

* * * * *